July 23, 1968 W. M. SCHOTT 3,394,235

STEREO AMPLIFICATION SYSTEM FOR RUMBLE REDUCTION

Filed June 4, 1964 2 Sheets-Sheet 1

INVENTOR.
Wayne M. Schott
BY James E. Tracy
Atty.

STEREO AMPLIFICATION SYSTEM FOR RUMBLE REDUCTION

Filed June 4, 1964 2 Sheets-Sheet 2

INVENTOR.
Wayne M. Schott
BY James E. Tracy
Atty.

3,394,235

STEREO AMPLIFICATION SYSTEM FOR RUMBLE REDUCTION

Wayne M. Schott, Oak Park, Ill., assignor to Zenith Radio Corporation, Chicago, Ill., a corporation of Delaware Filed June 4, 1964, Ser. No. 372,645
5 Claims. (Cl. 179—100.4)

Figure 1:
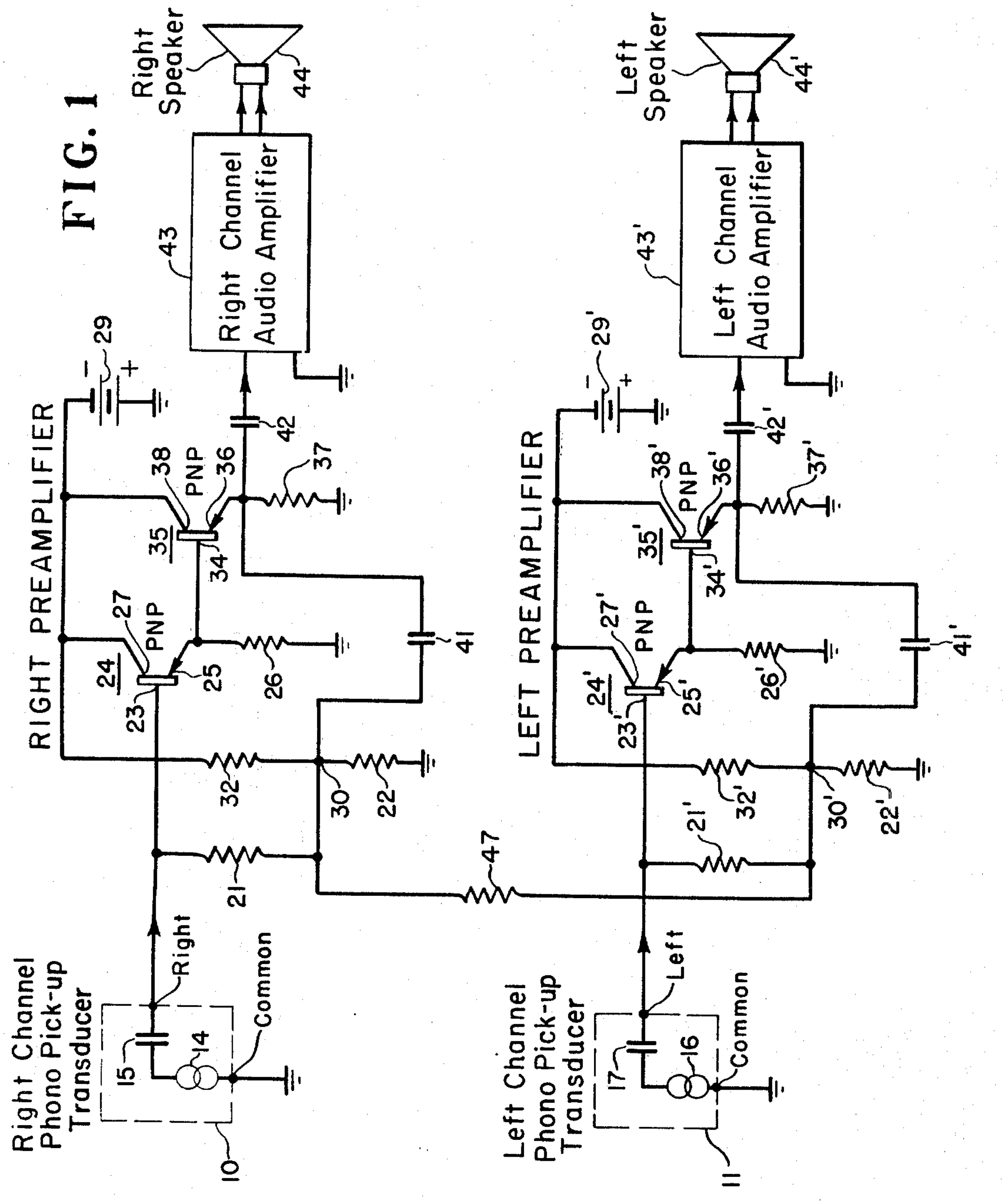

This invention relates to a stereophonic amplification system for amplifying the binaural audio signals derived by a stereo pick-up cartridge from a single groove of a stereo record. More particularly, the invention pertains to a novel arrangement for eliminating undesired low-frequency, audible rumble distortion components that may appear in the right and left signals developed in the transducing apparatus included in the cartridge.

The right and left signals are respectively recorded as undulations in the two walls or sides of a V-shaped groove of a conventional stereo phonograph record disc. Each of the two walls forms an angle of approximately 45° with the plane of the record disc. A typical stereo phonograph pick-up cartridge includes transducing apparatus and a single stylus or needle which simultaneously senses the two sides of the V-shaped groove, the component of stylus movement in a direction perpendicular to one of the groove sides resulting in the development of the right signal in one output of the transducing apparatus, and the component of stylus movement in a direction perpendicular to the other one of the groove sides resulting in the development of the left signal in another output of the transducing apparatus.

Unfortunately, the stylus is also subject to undesired extraneous vertical modulations or vibrations (motion in a direction perpendicular to the plane of the record disc) which result in the introduction of vertical rumble, low frequency distortion components of the same amplitude but of opposite phase into the right and left signals developed by the transducing apparatus. These unwanted extraneous vibrations may be attributable to several causes. For example, the mechanical parts of a record player are never absolutely perfect; even when adhering to minute tolerances, there may be imperfections in the drive motor, turntable and other parts which cause undesired vertical modulations of the stylus and a consequent oppressive rumbling noise or hum in the right and left signals. This is particularly objectionable during low-volume passages of the recorded signals.

Since the vertical rumble distortion appears in the right and left signals as signal components of equal amplitude but of opposite phase, they may be conveniently cancelled or balanced out in a stereo amplification system simply by tying or cross-coupling the right-channel amplifier to the left-channel amplifier by way of a resistor, as has been done in the past. With that arrangement, the unwanted distortion components in each channel are bucked out by their 180° counterparts in the other channel.

While this prior approach has been effective in successfully cancelling rumble, it has been achieved by sacrificing a substantial amount of channel separation or stereo effect—namely, the extent to which the right and left channels are isolated or separated from each other. Such cross-coupling of the channels results in part of the left signal appearing in the right channel as cross-talk and part of the right signal appearing in the left channel as cross-talk. If the cross-talk is appreciable, as is necessary in the prior arrangement to cancel rumble, channel separation is diminished substantially.

To explain further, the instantaneous differences in amplitude and polarity of the right and left signals developed by the transducing apparatus provide the stereo effect, since obviously the more identical the signals are, the less will be the stereo effect. When both the right and left signals are absolutely identical, as is the case when a monaural record is played, there will be no stereo effect or channel separation whatsoever. When a stereo record is played, the desired differences between the right and left signals (commonly called L-R) results in the stylus having a vertical component of motion. In other words, vertical movement of the stylus represents and corresponds to the instantaneous differences in amplitude and polarity of the right and left signals developed by the transducing apparatus in the cartridge. Of course, the effect of this vertical motion of the stylus must be preserved to achieve the desired channel separation.

Hence, vertical movement of the stylus results from two effects—(1) undesired extraneous rumble vibrations, and (2) desired differences between the right and left signals which provide the stereo effect. However, in the prior arrangement in which the right and left amplifying channels are cross-coupled or tied together through a resistor, not only are the rumble distortion components cancelled but in addition the differences or spacial effects are at least partially nullified by the cross-talk with a consequent material decrease in channel separation. Thus, the desired complete isolation of the two channels is compromised in the prior arrangement because of the need to eliminate the vertical rumble.

The present invention removes rumble distortion without perceptibly or significantly affecting channel separation. It is, accordingly, an object of the present invention to provide a new and improved stereo amplification system for amplifying the right and left audio signals recorded on a stereo record.

It is a more specific object to eliminate rumble distortion components that may manifest themselves in the right and left signals developed by a stereo cartridge while at the same time preserving the stereo or spacial effect provided by the two signals.

The present invention takes advantage of the fact that actually the desired stereo effect is dependent only upon the audio signal components having frequencies in a predetermined portion of the frequency range of the recorded right and left signals. Specifically, and assuming that the frequency range from 20 to 15,000 cycles per second is covered by the right and left audio signals, the audio components having frequencies in the portion of the range from 400 to 15,000 cycles per second essentially contribute the stereo effect. The human ear cannot discern small variations in source location for any sound signal below 400 cycles per second. In other words, if an acoustic signal, of say 250 cycles per second, were emanating from the right speaker, a listener would not be aware of that fact and would not be able to determine whether the sound originated at the right or left speakers.

The amplifier system of the present invention is to be incorporated in a phonograph of the type comprising a stereophonic pickup cartridge adapted to track a stereophonic disc recording to produce separate right-channel and left-channel audio signals and further comprising a pair of physically separated audio-signal reproducers for concurrently and respectively reproducing the right-channel and left-channel audio signals to create a stereophonic rendition. The amplifier system comprises first and second audio amplifier channels, each including a preamplifier having an input circuit comprising a voltage divider. The channels have respective output circuits individually coupled to one of the audio-signal reproducers. There are means for applying the right-channel audio signal across the voltage divider of the input circuit of the first channel, and means for applying the left-channel audio signal across the voltage divider of the input circuit of the second channel. Frequency-independent coupling means, comprising a resistor connected between respective intermediate taps of the voltage dividers, effectively cross-couple the first and second channels with respect to all right-channel and left-channel audio-signal components of frequencies below approximately 200 cycles per second and supply both right-channel and left-channel audio-signal components of such frequencies to both of the audio-signal reproducers. The amplifier system also includes feedback means from the output circuit of each of the preamplifiers to an intermediate tap on the voltage divider in its input circuit for effectively reducing the impedance presented to the resistor by each of the voltage dividers with respect to right-channel and left-channel audio-signal components of frequencies higher than approximately 400 cycles per second to provide an effective separation in excess of fifteen decibels between the first and second channels for all such components.

Figure 2:
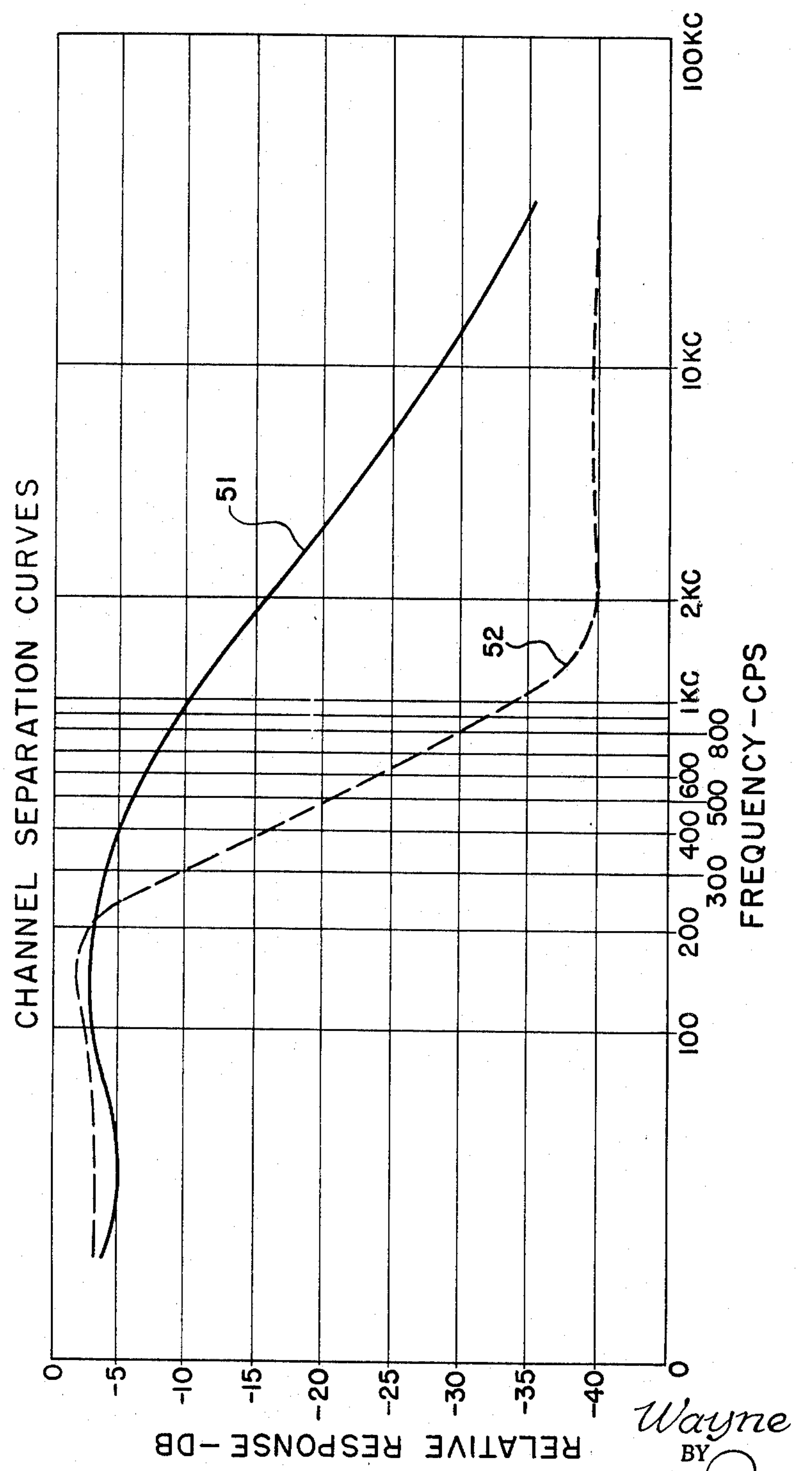

The features of this invention which are believed to be new are set forth with particularity in the appended claims. The invention, together with further objects and advantages thereof, may best be understood, however, by reference to the following description in conjunction with the accompanying drawings, in which:

FIGURE 1 schematically illustrates a stereo amplification system embodying the invention; and, FIGURE 2 discloses a pair of channel separation curves useful in demonstrating the improvement in stereo effect provided by the present invention over the prior arrangement for eliminating rumble distortion.

Turning now to the structural details of the amplification system shown in FIGURE 1, dashed blocks 10 and 11 respectively depict the right channel and left channel pick-up transducers of a stereo phonograph cartridge. Of course, the cartridge may include only a single transducer element which, upon being actuated by the stylus of the cartridge, is capable of producing right and left electrical signals at different outputs. Separate tranducers 10 and 11 have been shown merely for convenience. Preferably, transducing apparatus 10, 11 is of the ceramic type having a relatively high impedance—an impedance which varies inversely with frequency. Each transducer may therefore be represented by a zero impedance voltage signal source connected in series with a capacitor. In transducer 10 this is illustrated by voltage signal source 14 and capacitor 15, while in transducer 11 this is shown by voltage signal source 16 and capacitor 17. Transducing apparatus 10, 11 may be provided with only three output terminals designated right, left and common. The common terminal is shared by both transducers 10 and 11 and is connected to a plane of reference potential such as ground. The right and left output terminals, however, are connected only to transducers 10 and 11 respectively.

A voltage divider comprising a pair of resistors 21 and 22 is coupled between the right output terminal of transducer 10 and ground. The right terminal is also connected to the base 23 of a transistor 24 of the PNP variety, the emitter 25 of which is connected to ground via a resistor 26. The collector 27 of transistor 24 is connected to the negative terminal of a source of unidirectional operating potential, such as a battery 29, the positive terminal of which is grounded. The junction or tap 30 of resistors 21 and 22 is also coupled to the negative terminal of potential source 29 through a resistor 32.

Emitter 25 is also connected to the base 34 of another PNP transistor 35, the emitter 36 of which is grounded through a resistor 37. The collector 38 of transistor 35 is connected to the negative terminal of potential source 29. Emitter 36 is coupled back to junction 30 by way of a capacitor 41, and is coupled forward through a capacitor 42 to one input terminal of a right channel audio amplifier 43 whose other input terminal is grounded. The described circuitry between transducer 10 and amplifier 43 constitutes a preamplifier for the right channel. The amount of additional amplification required determines the number of amplification stages included in amplifier 43, the output of which is connected to a right speaker 44.

As is clearly apparent in the drawing, the described circuitry making up the right-channel amplifying system is duplicated identically for the left channel. Accordingly, the elements in the left channel are denoted by the same reference numerals, but primed, as their respective counterpart elements in the right channel. The right and left channels are cross-coupled by means of a resistor 47. Specifically, the resistor connects tap 30 to tap 30'.

Before considering the operation of the illustrated stereo amplification system, it is expedient to list the circuit parameters which were employed in a system actually constructed and successfully operated in accordance with FIGURE 1.

| | |
|---|---|
| Capacity **15** and **17** of transducers ------μμfd-- | 680 |
| Resistors **21** and **21'** ---------------ohms-- | 47K |
| Resistors **22** and **22'** ------------------do-- | 150K |
| Resistors **32** and **32'** ------------------do-- | 150K |
| Resistors **26** and **26'** ------------------do-- | 470K |
| Resistors **37** and **37'** ------------------do-- | 10K |
| Capacitors **41** and **41'** ----------------μfd-- | 5 |
| Transistors **24**, **24'**, **35**, and **35'** -------------- | GC343 |
| Potential sources **29** and **29'** ----------volts-- | 12 |
| Resistor **47** -----------------------ohms-- | 15K |

In considering the operation of the disclosed system, rumble distortion and the elimination thereof in accordance with the invention will be initially ignored. Moreover, since the two amplifying channels are identical in construction, the operation of only one, for example the right channel, need be considered in detail.

Each of transistors 24 and 35, by virtue of its associated circuitry, constitutes a conventional emitter follower and inasmuch as the emitter of the first one is coupled to the base of the second emitter follower they are effectively connected in cascade. Resistors 32 and 22 serve as bias resistors in order to fix the operating point for the first emitter follower. Feedback capacitor 41 effectively provides the right preamplifier with a relatively high input impedance which is necessary in order to efficiently match transducer 10 which, by nature of its construction, has a high impedance. Such an arrangement for providing a transistor amplifier, which normally has a relatively low input impedance, with a high impedance is well known and the manner in which this high input impedance is obtained may be demonstrated mathematically.

Without delving into a mathematical analysis, however, the obtaining of a high impedance input for the right preamplifier may be appreciated by considering the application of a signal voltage of 1 volt between base 23 and ground. Since the two emitter followers have degenerative feedback, and thus have less than unity voltage gain, the 1 volt signal at base 23 results in a signal of approximately .9 volt at emitter 36 which in turn is applied back to junction 30. Since the signals at all points in the preamplifier will be in phase, the .9 volt feedback signal at junction 30 will consequently be in phase with the 1 volt signal at base 23. With tap 30 of the voltage divider, comprising resistors 21 and 22, being established at $^9/_{10}$ of the voltage across the entire divider, this means that the effective or apparent impedance of resistor 22 is 9 times the impedance of resistor 21 which as mentioned previously is preferably 47K ohms. Hence, the total apparent impedance presented by voltage divider 21, 22 to the output of transducer 10 is relatively high and of the appropriate magnitude for optimum impedance matching.

Preferably, the first amplification stage in amplifier 43 is a transistor stage having a relatively low input impedance. It is therefore desirable to feed that input from a signal source which also has a relatively low impedance. Since, as is well known, the output of an emitter follower (between the emitter and ground) is inherently of low impedance, the first stage of amplifier 43 is also appropriately impedance matched.

When a stereo record is being played, the stylus of the cartridge moves in response to the undulations on both of the sides or walls of the V-shaped groove of the record and the component of stylus movement in a direction perpendicular to the groove side on which the right signal information is recorded actuates transducer 10 to develop between the right output terminal of the transducing apparatus and its common terminal, which is grounded, a right voltage signal which is applied between base 23 of transistor 24 and ground. While the two emitter followers in the right preamplifier do not effect any voltage amplification of the right signal from the transducer 10, current amplification does take place. The right signal, developed between emitter 36 of the second emitter follower and ground, is then applied through capacitor 42 to amplifier 43 which in turn amplifies it to the desired extent to produce the right signal at an appropriate amplitude for driving right speaker 44.

Meanwhile, the component of stylus movement in a direction perpendicular to the wall or side of the V-shaped groove of the stereo record on which the left signal has been recorded actuates transducer 11 to produce between the left and common output terminals of the transducing apparatus a voltage signal representing the left information. This signal, in turn, is amplified in the left preamplifier and in amplifier 43' to supply the left signal at a suitable magnitude for actuating left speaker 44'.

Turning now to the invention to which the application is directed, the undesired vertical extraneous vibrations of the stylus occur at relatively low frequencies, usually below 300 cycles per second, and the transducing apparatus responds thereto to introduce vertical rumble distortion components of the same low frequencies into both the right and left signals. Specifically, the distortion components are developed at the right and left output terminals of transducing apparatus 10, 11 at the same amplitude but of opposite phase. If a certain rumble component manifests itself at the right terminal as, for example, a positive-going signal, its mirror image (negative going signal) manifests itself at the left terminal. In the past, it has been a relatively simple matter to cancel one distortion component by means of the other by cross connecting the right and left terminals of the transducing apparatus together through a resistor.

However, since the vertical component of movement of the stylus in response to the undulations on the two side walls of the record groove represent the instantaneous differences in amplitude and polarity of the right and left signals, cross-coupling the right and left terminals of the transducing apparatus through a resistor results in appreciable degradation of channel separation. This occurs because the cross-coupling circuit introduces cross-talk between the channels and the differences are diminished.

In other words, the signal measured between the right and left terminals of transducing apparatus 10, 11 constitutes difference signal components corresponding to the instantaneous differences of the right and left signals. By tying those terminals together via a resistor, cross-talk is introduced between the right and left channels to materially compromise the channel separation. This is clearly shown by channel separation curve 51 in FIGURE 2 which is that obtained in a stereo system in which the right and left termnials of the transducing apparatus are cross-coupled by means of a resistor.

Curve 51 indicates that the channel separation is relatively poor for all audio signal components having frequencies below approximately 2000 cycles per second, since it is an accepted fact that only those signal components for which there is at least 15 db (decibels) separation between channels contribute substantially to the achievement of the stereo effect. For example, for audio signal components of approximately 1000 or 1K cycles per second there is only 10 db of separation according to curve 51, or in other words the right channel signal appears in the left channel 10 db down (with a 10 db attenuation), and vice-versa the left channel signal crosses into or appears in the right channel at a —10 db level.

While the objectionable rumble distortion components below 300 cycles per second are eliminated by the prior art approach, the audio signal components having frequencies between 400 and 2000 cycles per second, which are very important in providing the stereo effect, are also substantially affected by the cross-talk between channels with the result that the stereo effect is seriously diminished.

The fact that curve 51 varies with frequency indicates that the frequency dependent components in a stero amplification system determine, at least in part, the shape of the curve.

In the present invention, cross-talk is also purposely introduced between channels but it is in an amount which varies inversely with frequency such that the undesired vertical rumble, low frequency distortion components are selectively cancelled without significantly affecting the separation effect provided by the audio signal components in the portion of the range from 400–15,000 cycles per second. This is achieved by employing two voltage dividing arrangements in the cross-coupling network—one formed by resistor 47 and the effective impedance between tap 30' and ground, and the other being formed by resistor 47 and the effective impedance between tap 30 and ground.

To elucidate, resistor 22 effectively constitutes a source of the right voltage signal and this signal is dropped through the voltage divider comprising resistor 47 and resistor 22'. Conversely, resistor 22' provides a source of the left voltage signal and that signal is dropped through the voltage divider comprising resistor 47 and resistor 22. The voltage division ratios of these dividers, with respect to their associated taps 30 and 30' (namely, the relative impedances of the different portions 22, 47 and 22' of the dividers) change with frequency such that the percentage of the right voltage signal, developed across resistor 22 as a source, appearing between tap 30' and ground (namely, across resistor 22') is substantially greater at the low rumble distortion frequencies than the percentage of the right signal appearing across resistor 22' for the higher audio frequencies upon which the stereo effect depends. The voltage division ratio of the divider 47, 22' changes with frequency since the apparent impedance between tap 30' and ground, and therefore across resistor 22' increases as the frequency decreases. As the impedance across resistor 22' increases, a greater amount of right signal is injected into the left channel.

By the same token, the percentage of the left voltage signal, developed across resistor 22' as a source, impressed between tap 30 and ground is substantially greater for the vertical rumble distortion frequencies as compared to the percentage of the left signal appearing across resistor 22 for the frequencies from 400 cycles per second on up. The voltage division ratio of the divider 47, 22 varies with frequency because the effective impedance between tap 30 and ground, and consequently across resistor 22, increases as the frequency decreases. As the impedance across resistor 22 goes up, a greater amount of left signal is introduced into the right channel.

In this way, appreciable cross-talk is introduced for the low frequency distortion components, whereas negligible cross-talk is effected at the higher audio frequencies, with resultant excellent channel separation.

With the circuit constructed and successfully operated, the parameters of which have been enumerated hereinbefore, it was found that the apparent or effective impedance between each of taps 30 and 30' and ground varied from approximately 18K ohms at 100 cycles per second to 560 ohms at 1000 cycles per second and 120 ohms at 10,000 cycles per second.

The reason for such behavior may be explained or theorized as follows. The apparent impedance across any two terminals of a circuit may be defined as a ratio of a cause to an effect, the cause being an externally impressed potential or voltage variation and the effect being the current variation produced thereby through the circuit between those terminals. Assume now that some external voltage signal source is coupled between tap 30 and ground to apply a voltage variation of relatively low frequency across resistor 22. Since the capacitance 15 of transducer 10 represents a very high impedance for relatively low rumble frequencies, the external voltage source is not appreciably loaded by transducer 10 and the full magnitude of the voltage variation ends up between base 23 and ground. Because of the degenerative nature of operation of the cascade coupled emitter followers, the signal on base 23 results in a voltage signal at emitter 36 of the same phase and only very slightly diminished in amplitude. Hence, resistor 37 effectively now represents a voltage signal source for producing a voltage variation only slightly less in magnitude than that produced by the source coupled across resistor 22. Since emitter 36 and tap 30 are tied together through capacitor 41, the signal across resistor 37 bucks out or cancels substantially the entire voltage signal across resistor 22. This is akin to connecting two batteries of substantially the same potential in series opposition. The net voltage variation that will force current through the circuit is therefore relatively small, resulting in a correspondingly small current variation.

The cause, namely the voltage variation impressed between tap 30 and ground, is relatively high with respect to the effect or variation in current produced through resistor 22, and thus the ratio of cause to effect is relatively high indicating that the effective or apparent impedance across resistor 22 for the low frequency rumble distortion components is relatively high.

On the other hand, as the frequency of the voltage signal increases the capacitance 15 of transducer 10 exhibits a decreasing impedance to present an increasing load on any external voltage source coupled between tap 30 and ground. Consequently, any voltage variation impressed across resistor 22 ends up between base 23 and ground at reduced magnitude. The difference in magnitudes of the in-phase signals across resistors 37 and 22 is thus greater at the higher frequency audio signals, and thus more current is forced to flow through resistor 22. The ratio of cause to effect is therefore reduced since a given voltage variation, at a relatively high audio signal frequency, from tap 30 to ground produces greater current flow than at the lower vertical rumble distortion frequencies. As a consequence, the apparent impedance from tap 30 to ground decreases with increasing frequency. Of course, similar reasoning will show that the effective impedance between tap 30' and ground decreases as the frequency increases.

The degree of channel separation achieved by the present invention is illustrated by curve 52 in FIGURE 2. By lowering the apparent impedances presented between taps 30 and 30' and ground with increasing frequency smaller percentages of the right and left signals are interchanged between channels through resistor 47. On the other hand, for the rumble distortion components (below 300 cycles per second), the high impedances presented between taps 30 and 30' and ground result in appreciable cross-talk to the end that these distortion components are balanced out in each channel. Since at least 15 db separation provides no perceptible cross-talk, observance of curve 52 reveals that with the present invention, none of the audio signal components having frequencies from 400 cycles per second on up will be adversely affected by the signals in the other channel. Since these are the frequencies upon which the stereo effect depends, the invention has very adequately preserved that stereo effect while at the same time has selectively cancelled the undesired vertical rumble components.

Comparing curves 51 and 52 dramatically illustrates the merit of the present invention as it is apparent that with the prior arrangement, illustrated by curve 51, rumble elimination is accompanied by a material loss of separation for many of the frequencies that are essential to provide the stereo effect.

Of course, while PNP type transistors have been embodied in the invention as illustrated, it is obvious that by simple modification transistors of opposite gender, namely NPN, can be utilized.

The invention therefore provides a stereo amplification system for achieving cancellation of the vertical modulation or rumble distortion components that may be introduced into the right and left signals while at the same time avoiding the introduction of significant cross-talk between the right and left channels for the audio signal components having frequencies which provide the stereo or separation effect.

While a particular embodiment of the invention has been shown and described, modifications may be made, and it is intended in the appended claims to cover all such modifications as may fall within the true spirit and scope of the invention.

I claim:

1. A stereo amplification system for amplifying the right and left audio signals, respectively recorded on the two sides of a V-shaped groove of a horizontally disposed stereo phonograph record disc each of the two sides forming an angle of approximately 45° with the plane of said record disc, developed by:

a stereo phonograph pick-up cartridge including transducing apparatus having an impedance which varies inversely with frequency and a single stylus which simultaneously senses the two sides of the V-shaped groove of said record disc, the component of stylus movement in a direction perpendicular to one of the groove sides resulting in the development of said right signal in one output of said transducing apparatus and the component of stylus movement in a direction perpendicular to the other one of the groove sides resulting in the development of said left signal in another output of said transducing apparatus, the desired stereo or separation effect being dependent upon only the audio signal components having frequencies in a predetermined portion of the frequency range of the recorded right and left signals, said stylus being subject to undesired vertical extraneous vibrations at relatively low frequencies in, and below said predetermined portion of, said frequency range to introduce vertical rumble, low frequency distortion components of the same amplitude but of opposite phase into the right and left signals developed by said transducing apparatus said system comprising:

right-channel amplifying means for amplifying said right signal and including a right voltage divider coupled across said one output of said transducing apparatus, a pair of cascade coupled emitter followers, and a capacitor coupled between the output of the second emitter follower and a tap along said right voltage divider;

left-channel amplifying means for amplifying said left signal and including a left voltage divider coupled across said other output of said transducing apparatus, a pair of cascade coupled emitter followers, and a capacitor coupled between the output of the second emitter follower and a tap along said left voltage divider;

and means including a resistor for cross-coupling said taps to purposely introduce cross-talk between said right-channel and left-channel amplifying means, the relative impedances of portions of said voltage dividers and said resistor automatically changing to vary the amount of cross-talk inversely with frequency to selectively cancel said undesired vertical rumble distortion components which may be present in said right and left signals without introducing significant cross-talk between said right-channel and left-channel amplifying means for audio signal components in said predetermined portion of said range.

2. A stereo amplification system for amplifying the right and left audio signals, respectively recorded on the two sides of a V-shaped groove of a horizontally disposed stereo phonograph record disc each of the two sides forming an angle of approximately 45° with the plane of said record disc, developed by:

a stereo phonograph pick-up cartridge including transducing apparatus, having right, left and common output terminals and having an impedance which varies inversely with frequency, and a single stylus which simultaneously senses the two sides of the V-shaped groove of said record disc, the component of stylus movement in a direction perpendicular to one of the groove sides resulting in the development of said right signal between said right and common output terminals of said transducing apparatus and the component of stylus movement in a direction perpendicular to the other one of the groove sides resulting in the development of said left signal between said left and common output terminals of said transducing apparatus, the desired stereo or separation effect being dependent upon only the audio signal components having requencies in a predetermined portion of the frequency range of the recorded right and left signals, said stylus being subject to undesired vertical extraneous vibrations at relatively low frequencies in, and below said predetermined portion of, said frequency range to introduce vertical rumble, low frequency distortion components of the same amplitude but of opposite phase into the right and left signals developed by said transducing apparatus said system comprising:

means for coupling said common output terminal of said transducing apparatus to a plane of reference potential;

right-channel amplifying means for amplifying said right signal and including a right voltage divider coupled between said right terminal of said transducing apparatus and said plane of said reference potential, a first emitter follower having its base coupled to said right terminal and its emitter coupled through a resistor to said plane of reference potential, a second emitter follower having its base coupled to the emitter of the first emitter follower and its emiter coupled through a resistor to said plane of reference potential, and a capacitor coupled between the emitter of the second emitter follower and a tap along said right voltage divider;

left-channel amplifying means for amplifying said left signal and including a left voltage divider coupled between said left terminal of said transducing apparatus and said plane of reference potential, a first emitter follower having its base coupled to said left terminal and its emitter coupled through a resistor to said plane of reference potential, a second emitter follower having its base coupled to the emitter of the first emiter follower and its emitter coupled through a resistor to said plane of reference potential, and a capacitor coupled between the emitter of the second emitter follower and a tap along said left voltage divider;

and means including a cross-coupling resistor coupled between said taps to purposely introduce cross-talk between said right-channel and left-channel amplifying means, the relative impedances of portions of said voltage dividers and said cross-coupling resistor automatically changing to vary the amount of cross-talk inversely with frequency to selectively cancel said undesired vertical rumble distortion components which may be present in said right and left signals without introducing significant cross-talk for audio signal components in said predetermined portion of said range.

3. In a phonograph of the type comprising a stereophonic pickup cartridge adapted to track a stereophonic disc recording to produce separate right-channel and left-channel audio signals and further comprising a pair of physically separated audio-signal reproducers for concurrently and respectively reproducing said right-channel and left-channel audio signals to create a stereophonic rendition, an amplifier system comprising:

first and second audio amplifier channels, each including a preamplifier having an input circuit comprising a voltage divider, and said channels having respective output circuits individually coupled to one of said audio-signal reproducers;

means for applying said right-channel audio signal across the voltage divider of said input circuit of said first channel;

means for applying said left-channel audio signal across the voltage divider of said input circuit of said second channel;

frequency-independent coupling means comprising a resistor connected between respective intermediate taps of said voltage dividers for effectively cross-coupling said first and second channels with respect to all right-channel and left-channel audio-signal components of frequencies below approximately 200 cycles per second and to supply both right-channel and left-channel audio-signal components of such frequencies to both of said audio-signal reproducers;

and feedback means from the output circuit of each of said preamplifiers to an intermediate tap on the voltage divider in its input circuit for effectively reducing the impedance presented to said resistor by each of said voltage dividers with respect to right-channel and left-channel audio-signal components of frequencies higher than approximately 400 cycles per second to provide an effective separation in excess of fifteen decibels between said first and second channels for all such components.

4. An audio amplifier system comprising:

a first amplifier channel including a substantially unity-gain preamplifier having an input circuit comprising series-connected first and second impedance elements;

a second amplifier channel, including a preamplifier having an input circuit comprising series-connected third and fourth impedance elements;

means for applying a right-channel audio signal from a first capacitive signal source across the series combination of said first and second impedance elements;

means for applying a left-channel audio signal from a second capacitive source across the series combination of said third and fourth impedance elements;

frequency-independent coupling means comprising a resistor connecting the junction between said first and second impedance elements and the junction between said third and fourth impedance elements for effectively cross-coupling said first and second amplifier channels with respect to all right-channel and left-channel audio-signal components of frequencies below approximately 200 cycles per second;

and feedback means from the output of each of said preamplifiers to said junction in its input circuit for effectively reducing the impedances of said second and fourth impedance elements, as seen from said first and second sources respectively, with respect to audio-signal components of frequencies above approximately 400 cycles per second to provide an effective separation in excess of fifteen decibels between said first and second amplifier channels for all such components.

5. An audio amplifier system as set forth in claim 4, in which said first, second, third and fourth impedance elements are all fixed resistors.

References Cited

UNITED STATES PATENTS

| | | | |
|---|---|---|---|
| 3,059,065 | 10/1962 | Tourtellot | 179—100.4 |
| 3,094,587 | 2/1963 | Dow | 179—1 |
| 3,162,730 | 12/1964 | Owen | 179—100.4 |
| 2,958,738 | 11/1960 | Gray | 179—100.4 |
| 3,005,873 | 10/1961 | Janowsky | 179—1 |

BERNARD KONICK, *Primary Examiner.*

R. CARDILLO, *Assistant Examiner.*